United States Patent
Opferman et al.

(10) Patent No.: US 9,524,227 B2
(45) Date of Patent: Dec. 20, 2016

(54) APPARATUSES AND METHODS FOR GENERATING A SUPPRESSED ADDRESS TRACE

(71) Applicant: Intel Corporation, Santa Clara, CA (US)

(72) Inventors: Toby Opferman, Hillsboro, OR (US);
James B. Crossland, Banks, OR (US);
Jason W. Brandt, Austin, TX (US);
Beeman C. Strong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 14/327,375

(22) Filed: Jul. 9, 2014

(65) Prior Publication Data

US 2016/0011872 A1    Jan. 14, 2016

(51) Int. Cl.
*G06F 11/00* (2006.01)
*G06F 11/36* (2006.01)
*G06F 9/30* (2006.01)
*G06F 11/34* (2006.01)
*G06F 9/38* (2006.01)

(52) U.S. Cl.
CPC ....... *G06F 11/3636* (2013.01); *G06F 9/30145* (2013.01); *G06F 9/3877* (2013.01); *G06F 11/348* (2013.01); *G06F 11/3466* (2013.01); *G06F 11/3471* (2013.01); *G06F 11/36* (2013.01)

(58) Field of Classification Search
CPC G06F 9/30145; G06F 9/3877; G06F 11/3466; G06F 11/3471; G06F 11/348; G06F 11/36; G06F 11/3636

See application file for complete search history.

(56) References Cited

U.S. PATENT DOCUMENTS

| | | | | |
|---|---|---|---|---|
| 5,978,902 A | * | 11/1999 | Mann | G06F 11/348 712/227 |
| 7,010,665 B1 | * | 3/2006 | Toll | G06F 9/30003 711/215 |
| 7,111,148 B1 | * | 9/2006 | Toll | G06F 9/30054 711/220 |

(Continued)

FOREIGN PATENT DOCUMENTS

| KR | 10-2012-0083800 A | 7/2012 |
|---|---|---|
| TW | 200307867 A | 12/2003 |

OTHER PUBLICATIONS

Intel Developer Zone, "Processor Tracing", Sep. 10, 2014, 3 pages, http://software.intel.com/en-us/blogs/2013/09/18/processor-tracing.

(Continued)

*Primary Examiner* — Joshua P Lottich
(74) *Attorney, Agent, or Firm* — Nicholson De Vos Webster & Elliott, LLP

(57) ABSTRACT

Methods and apparatuses for generating a suppressed address trace are described. In some embodiments, a processor includes a trace generator having a trace suppressor that outputs a suppressed address trace for instructions executed by the processor. In some embodiments, a method to generate a suppressed address trace for a processor includes generating a suppressed address trace of executed instructions from a trace suppressor of a trace generator of the processor.

25 Claims, 14 Drawing Sheets

(56) References Cited

U.S. PATENT DOCUMENTS

| | | | | |
|---|---|---|---|---|
| 7,155,570 B1* | 12/2006 | Singh | ................. | G06F 9/3802 710/52 |
| 7,197,671 B2* | 3/2007 | Swaine | ................. | G06F 11/25 712/227 |
| 2004/0030962 A1* | 2/2004 | Swaine | ................. | G06F 11/25 714/45 |
| 2005/0268177 A1* | 12/2005 | John | ................. | G06F 11/3471 714/47.1 |
| 2005/0289399 A1* | 12/2005 | Kimura | ............... | G06F 11/3636 714/45 |
| 2005/0289400 A1* | 12/2005 | Kimura | ............... | G06F 11/3636 714/45 |
| 2006/0294343 A1* | 12/2006 | Rejmaniak | ............. | G06F 21/71 712/227 |
| 2009/0044059 A1* | 2/2009 | Sakiyama | ........ | G01R 31/31703 714/45 |
| 2009/0089626 A1* | 4/2009 | Gotch | ................. | G06F 11/3476 714/45 |
| 2009/0281984 A1* | 11/2009 | Black | ................... | H04L 43/026 |
| 2012/0066552 A1* | 3/2012 | Gilkerson | ........... | G06F 11/3471 714/45 |
| 2012/0185675 A1* | 7/2012 | Kim | ................... | G06F 9/30072 712/216 |
| 2014/0089642 A1* | 3/2014 | Gottschlich | ......... | G06F 11/3664 712/220 |
| 2015/0006863 A1* | 1/2015 | McGowan | .......... | G06F 11/3636 712/227 |

OTHER PUBLICATIONS

Offce action with English translation from Korean Patent Application No. 10-2015-0080665, mailed Jun. 16, 2016, 17 pages.
Search report with English translation from Taiwan Patent Application No. 104117958, dated Apr. 21, 2016, 2 pages.

* cited by examiner

```
501 ──▶ mov    rdx,qword ptr [rcx+18h]
        (1)    Address "0x7F0018" is output.
        (2)    Address "0x7F0018" is output.
        (3)    Address "0x7F0000" is output as a register hint packet.

502 ──▶ mov    rax,qword ptr [rcx]
        (1)    Address "0x7F0000" is output.
        (2)    Address "0x7F0000" is output.
        (3)    No packet is output.

503 ──▶ xor    esi,esi
504 ──▶ sub    rax,qword ptr [rdx+2180h]
        (1)    Address "0x7F62180" is output.
        (2)    Address "0x7F62180" is output.
        (3)    Address "0x7F60000" is output as a register hint packet.

505 ──▶ mov    rbx,rcx
506 ──▶ mov    qword ptr [rdx+0A20h],rax
        (1)    Address "0x7F60A20" is output.
        (2)    Address "0x7F60A20" is output.
        (3)    No packet is output.

507 ──▶ mov    rax,qword ptr [rcx+10h]
        (1)    Address "0x7F0010" is output.
        (2)    Address "0x7F0010" is output.
        (3)    No packet is output.

508 ──▶ cmp    dword ptr [GlobalVariableOne],esi
        (1)    Address "GlobalVariableOne" is output.
        (2)    No packet is output.
        (3)    No packet is output.

509 ──▶ jbe    FirstBranch
510 ──▶ mov    edi, dword ptr [GlobalVariableTwo]
        (1)    Address "GlobalVariableTwo" is output.
        (2)    No packet is output.
        (3)    No packet is output.

511 ──▶ mov    rcx,qword ptr [rbx+18h]
        (1)    Address "0x61F018" is output.
        (2)    Address "0x61F018" is output.
        (3)    Address "0x61F000" is output as a register hint packet.

512 ──▶ cmp    qword ptr [rdi+rcx],0
        (1)    Address "0x7F0100" is output.
        (2)    Address "0x7F0100" is output.
        (3)    Address "0x7F0100" is output.

513 ──▶ je     FirstSkip

514 ──▶ mov    rcx,qword ptr [rdi+rcx]
        (1)    Address "0x7F0100" is output.
        (2)    Address "0x7F0100" is output.
        (3)    Address "0x7F0100" is output.
```

FIG. 5A

```
515 ─▶ mov     rax,qword ptr [rbx]
        (1)    Address "0x61F000" is output.
        (2)    Address "0x61F000" is output.
        (3)    No packet is output.

516 ─▶ cmp     qword ptr [rcx+8],rax
        (1)    Address "0x7F0008" is output.
        (2)    Address "0x7F0008" is output.
        (3)    No packet is output.

517 ─▶ jne     FirstSkip
518 ─▶ FirstBranch:
519 ─▶ mov     rax,qword ptr [rbx+18h]
        (1)    Address "0x61F018" is output.
        (2)    Address "0x61F018" is output.
        (3)    No packet is output.

520 ─▶ mov     dword ptr [rax+0A28h],esi
        (1)    Address "0x51500A28" is output.
        (2)    Address "0x51500A28" is output.
        (3)    Address "0x51500000" is output as a register hint packet.

521 ─▶ mov     rax,qword ptr [rbx+20h]
        (1)    Address "0x61F020" is output.
        (2)    Address "0x61F020" is output.
        (3)    No packet is output.

522 ─▶ mov     rdx,qword ptr [rbx+18h]
        (1)    Address "0x61F018" is output.
        (2)    Address "0x61F018" is output.
        (3)    No packet is output.

523 ─▶ mov     rcx,qword ptr [rax]
        (1)    Address "0x51500000" is output.
        (2)    Address "0x51500000" is output.
        (3)    No packet is output.

524 ─▶ add     rdx,0A20h
525 ─▶ FirstSkip:
```

FIG. 5B

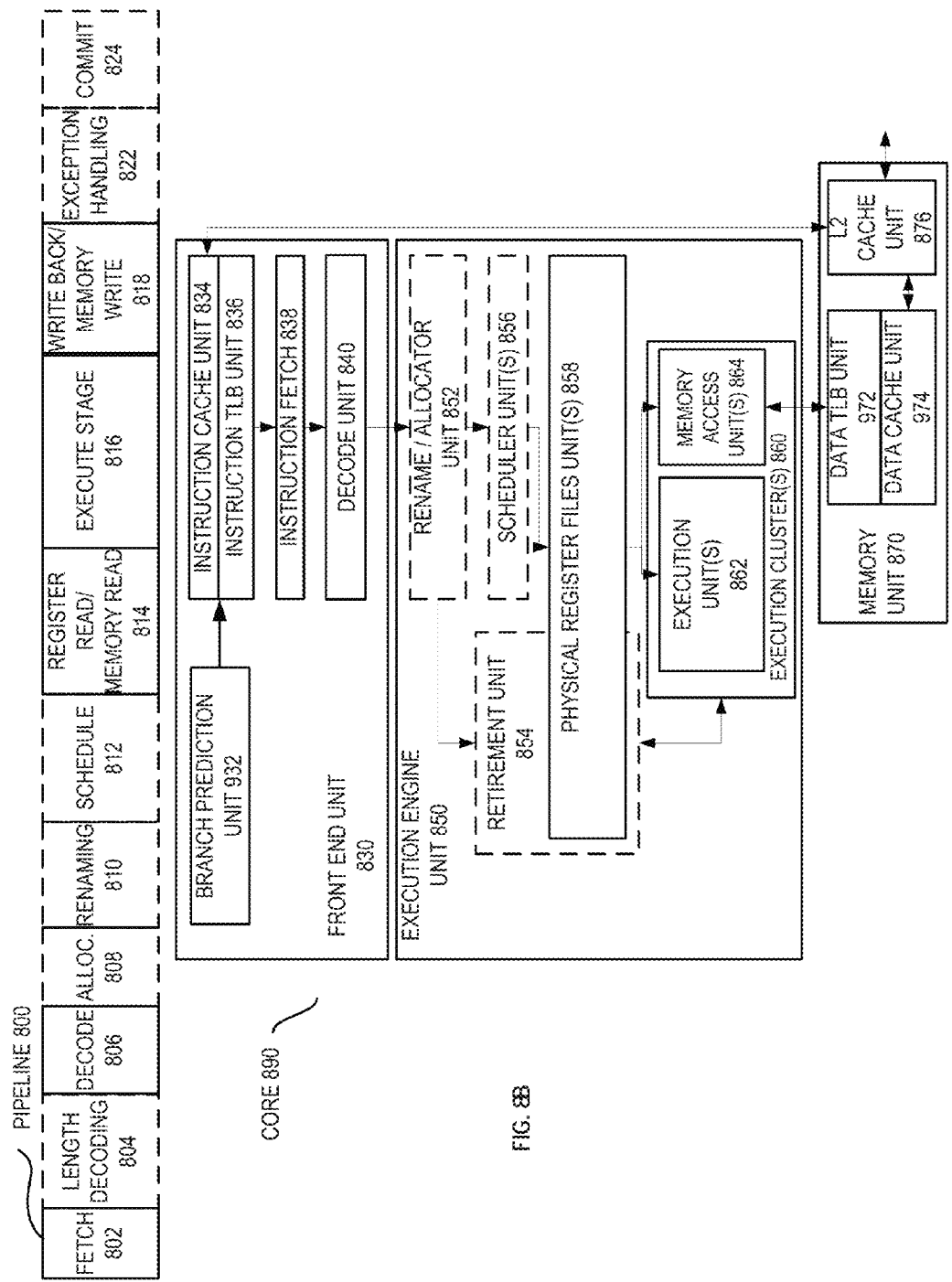

APPARATUSES AND METHODS FOR GENERATING A SUPPRESSED ADDRESS TRACE

FIELD OF INVENTION

The field of invention relates generally to a computer processor trace, and, more specifically, to generating a suppressed address trace.

BACKGROUND

A processor, or set of processors, executes instructions from an instruction set, e.g., the instruction set architecture (ISA). The instruction set is the part of the computer architecture related to programming, and generally include the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present invention is illustrated by way of example and not limitation in the figures of the accompanying drawings, in which like references indicate similar elements and in which:

FIGS. 5(A)-5(B) illustrate exemplary executions of suppressed address traces.

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention.

DETAILED DESCRIPTION

Figure 1:
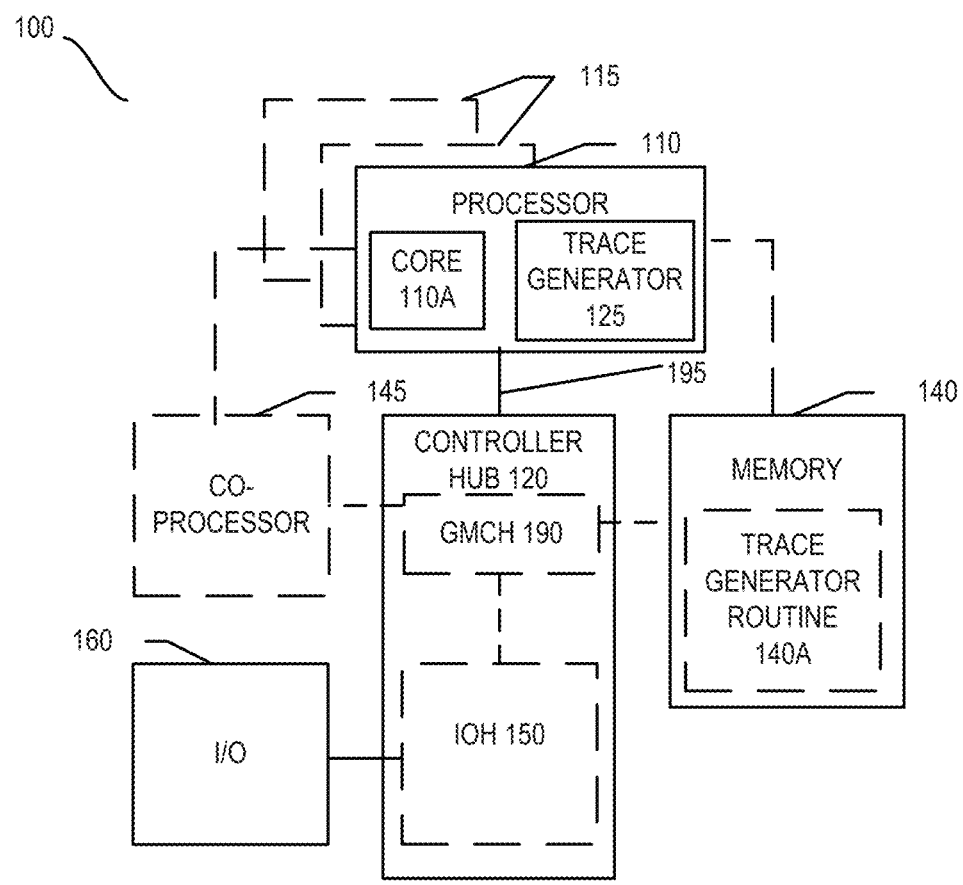
FIG. 1 illustrates a block diagram of an exemplary computer architecture.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Overview

The ISA is distinguished from the microarchitecture, which is the internal design of the processor implementing the ISA. Processors with different microarchitectures can share a common instruction set. For example, Intel® processors, e.g., Intel® Core™ processors, and Advanced Micro Devices, Inc. of Sunnyvale Calif. processors implement nearly identical versions of the x86 instruction set (with some extensions having been added to newer versions), but have different internal designs. For example, the same register architecture of the ISA may be implemented in different ways in different micro-architectures using well known techniques, including dedicated physical registers, one or more dynamically allocated physical registers using a register renaming mechanism, e.g., the use of a Register Alias Table (RAT), a re-order buffer (ROB) and a retirement register file; the use of multiple maps and a pool of registers, etc. Unless otherwise specified, the phrases register architecture, register file, and register refer to that which is visible to the software and/or programmer and the manner in which instructions specify registers. Where specificity is desired, the adjective logical, architectural, or software visible will be used to indicate registers/files in the register architecture, while different adjectives will be used to designate registers in a given micro-architecture (e.g., physical register, reorder buffer, retirement register, or register pool).

An instruction set includes one or more instruction formats. A given instruction format defines various fields (number of bits, location of bits) to specify, among other things, the operation to be performed and the operand(s) on which that operation is to be performed. A given instruction is generally expressed using a given instruction format and specifies the operation and the operands. An instruction stream is a specific sequence of instructions, where each instruction in the sequence is an occurrence of an instruction in an instruction format.

Scientific, financial, auto-vectorized general purpose, RMS (recognition, mining, and synthesis)/visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform the same operation on multiple data items. SIMD technology is especially suited to processors that can logically divide the bits in a register into a number of fixed-sized data elements, each of which represents a separate value. For example, the bits in a 64-bit register may be specified as a source operand to be operated on as four separate 16-bit data elements, each of which represents a separate 16-bit value. As another example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as the packed data type or vector data type, and operands of this data type are referred to as packed data operands or vector operands. In other words, a packed data item or vector refers to a sequence of packed data elements; and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that have only one or has more than two source vector operands; that operate in a horizontal fashion; that generate a result vector operand that is of a different size, that have a different size of data elements, and/or that have a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction).

The instruction set architecture may include at least some SIMD instructions that specify vector operations and that have fields to select source registers and/or destination registers from these vector registers (an exemplary SIMD instruction may specify a vector operation to be performed on the contents of one or more of the vector registers, and the result of that vector operation to be stored in one of the vector registers). Different embodiments of the invention may have different sized vector registers and support more/less/different sized data elements.

The size of the multi-bit data elements specified by a SIMD instruction (e.g., byte, word, double word, quad word) determines the bit locations of the "data element positions" within a vector register, and the size of the vector operand determines the number of data elements. A packed data element refers to the data stored in a particular position. In other words, depending on the size of the data elements in the destination operand and the size of the destination operand (the total number of bits in the destination operand) (or put another way, depending on the size of the destination operand and the number of data elements within the destination operand), the bit locations of the multi-bit data element positions within the resulting vector operand change (e.g., if the destination for the resulting vector operand is a vector register (in this discussion vector registers and packed data element registers are used interchangeably), then the bit locations of the multi-bit data element positions within the destination vector register change). For example, the bit locations of the multi-bit data elements are different between a vector operation that operates on 32-bit data elements (data element position 0 occupies bit locations 31:0, data element position 1 occupies bit locations 63:32, and so on) and a vector operation that operates on 64-bit data elements (data element position 0 occupies bit locations 63:0, data element position 1 occupies bit locations 127:64, and so on). Data element sizes of 8-bit bytes (B), 16-bit words (W), 32-bit doublewords (D) or single precision floating point, and 64-bit quadwords (Q) or double precision floating point are considered, although other widths are also possible.

Exemplary Computer Architecture

A processor, such as those discussed herein, generally executes instructions that operate (e.g., add, move, etc.) on operands. A processor trace allows the output (e.g., for viewing) of the activity of the processor. For example, a processor trace may capture information about software execution on each hardware thread (e.g., using dedicated hardware facilities) so that after execution completes a user or software can process the captured trace data and/or reconstruct the exact program flow.

The captured processor trace may be collected in data packets, e.g., one or more packets for each instruction executed. The processor trace (e.g., the data set) may include control flow tracing, which includes in their packets the timing and program flow information (e.g. branch targets, branch taken/not taken indications) and program-induced mode related information (e.g., state transitions). These packets may be buffered internally (e.g., in the processor) before being outputted. The processor trace (e.g., the outputted data set) may be outputted by writing it to a file, e.g., to memory, and/or to a port, such as the Joint Test Action Group-Debug Port (JTAG-DP). The processor trace may be buffered internally before being suppressed and then sent to a file, e.g., to memory, and/or to a port. In one embodiment, the processor address trace is outputted to a debugger or performance profiler. The processor trace may include data value (DV) tracing and/or data address tracing, such as data linear addresses (DLAs). The processor trace may include data value (DV) tracing packets and/or data address tracing packets, such as data linear address (DLA) packets. The data value and data address trace (e.g., packets) created by a program's memory accesses (e.g., a read or a write) may create an undesirably large processor trace output, e.g., data set. The data address or addresses accessed by an instruction may create an undesirably large sized address trace (e.g., packet of data) of a processor trace. In one embodiment, a processor trace (e.g., an outputted data set that includes DV and DLA packets) is over sixty-three times the size (e.g., in bits) of a processor trace output that includes only control flow packets. Suppression may occur before a packet is generated (e.g. not including an address in the packet at all and with or without a trace [e.g., packet] being buffered internally).

FIG. 1 is a block diagram of an exemplary computer architecture 100. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices having a processor are also suitable for a suppressed address trace. In general, a huge variety of systems or electronic devices capable of incorporating a processor and/or other execution logic as disclosed herein are generally suitable for a suppressed address trace.

System 100 is in accordance with one embodiment of the present invention. The system 100 includes one or more processors 110, 115, which are coupled to a controller hub 120. In one embodiment the controller hub 120 includes a graphics memory controller hub (GMCH) 190 and an Input/Output Hub (IOH) 150 (which may be on separate chips); the GMCH 190 includes memory and graphics controllers to which are coupled memory 140 and a coprocessor 145; the IOH 150 is couples input/output (I/O) devices 160 to the GMCH 190. Alternatively, one or both of the memory and graphics controllers are integrated within the processor (as described herein), the memory 140 and the coprocessor 145 are coupled directly to the processor 110, and the controller hub 120 in a single chip with the IOH 150.

The optional nature of additional processors 115 is denoted in FIG. 1 with broken lines. Each processor 110, 115 may include one or more of the processing cores (110A), e.g., as described herein, and may be some version of the processor 1100.

The memory 140 may be, for example, dynamic random access memory (DRAM), phase change memory (PCM), or a combination of the two. For at least one embodiment, the controller hub 120 communicates with the processor(s) 110, 115 via a multi-drop bus, such as a frontside bus (FSB), point-to-point interface such as QuickPath Interconnect (QPI), or similar connection 195.

In one embodiment, the coprocessor 145 is a special-purpose processor, such as, for example, a high-throughput many integrated core (MIC) processor, a network or communication processor, compression engine, graphics processor, GPGPU, embedded processor, or the like. In one embodiment, controller hub 120 may include an integrated graphics accelerator.

There can be a variety of differences between the physical resources 110, 115 in terms of a spectrum of metrics of merit including architectural, microarchitectural, thermal, power consumption characteristics, and the like.

In one embodiment, the processor 110 executes instructions that control data processing operations of a general type. Embedded within the instructions may be coprocessor instructions. The processor 110 recognizes these coprocessor instructions as being of a type that should be executed by the attached coprocessor 145. Accordingly, the processor 110 issues these coprocessor instructions (or control signals representing coprocessor instructions) on a coprocessor bus or other interconnect, to coprocessor 145. Coprocessor(s) 145 accept and execute the received coprocessor instructions.

Processor 110 includes a hardware trace generator 125. This trace generator 125, while illustrated as being external to a core 110A, in some embodiments is internal to the core 110A. Hardware trace generator may generate a processor trace, e.g., as discussed herein. In one embodiment, hardware trace generator includes a trace suppressor to output a suppressed address trace of an executed instruction(s). Trace suppressor may be (e.g., hardware) logic to suppress a processor (e.g., address) trace. As used herein, a processor trace (e.g., address trace) may refer to a generated or outputted packet or packets of trace data, e.g., DV and/or DLA packets. Trace suppressor may be software code to suppress a processor trace. In one embodiment, trace suppressor compresses the address data (e.g., the addresses of each operand) of the processor trace. Trace suppression may be used, for example, to reduce the bandwidth required to transmit the trace and/or the storage required to store the trace. Additionally or alternatively, a trace suppressor removes data generated during a processor trace operation (e.g., before being output to a user and/or to an analyzing program) such that no output is generated for a particular operation and/or instruction in the outputted data trace, e.g., as described further in reference to FIGS. 5A-5B below. Trace generator (e.g., trace suppressor) may be hardware, software, firmware, or any combination thereof. For example, trace generator may include software, such as stored as trace generator routine 140A, to generate a suppressed trace as discussed herein. In one embodiment, trace generator includes trace suppressor software stored in memory to generate a suppressed trace as discussed herein. Trace generator routine 140A may be separate from any software being traced by the trace generator. A suppressed data trace generally refers to a set of data from a processor trace that is smaller in size than the unsuppressed data trace, e.g., via removal of certain address data as disclosed herein. In certain embodiments, suppression includes there being no output (e.g., no packet outputted) for suppressible, executed instructions. While in other embodiments, suppression includes outputting a smaller packet relative to an unsuppressed packet, for example, the suppressed output being a header byte(s) with no payload or a different (non-header) packet that indicates that this memory address(es) was suppressed but does not include the address(es) itself.

Figure 2:
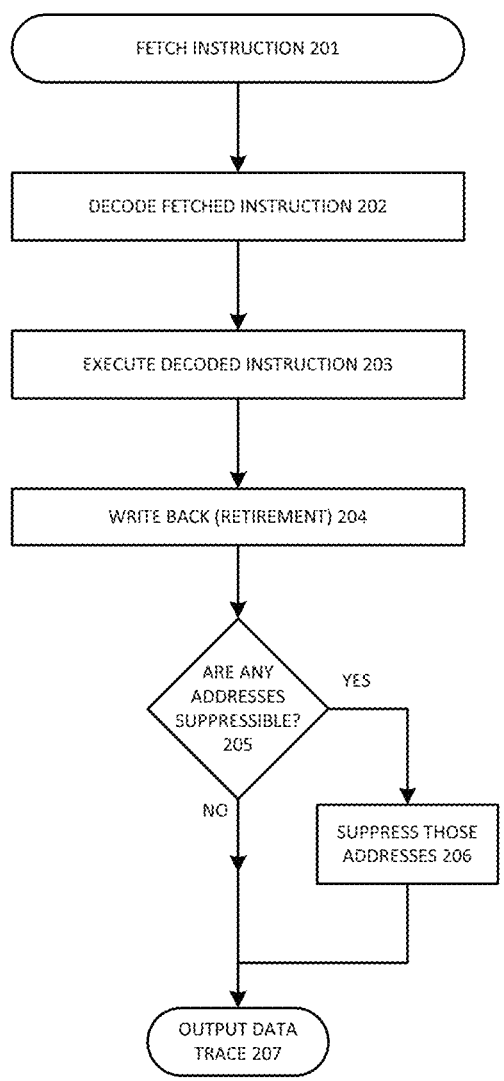
FIG. 2 illustrates an embodiment of a flow diagram of a suppressed address trace.

FIG. 2 illustrates an embodiment of a flow diagram of a suppressed address trace 200, e.g., within a processor. As depicted, an instruction is fetched 201, e.g., by a hardware instruction fetch unit. A fetched instruction is then decoded 202, e.g., by a hardware instruction decode unit. The decoded, fetched instruction is then executed 203, e.g., by a hardware execution unit. The executed instruction is then written back 204, for example, when the returned results are retired, e.g., by a hardware retirement unit. If there are any suppressible addresses (205), for example if there are any (i) relative addresses, such as an instruction accessing an address that references (e.g., with or without a specified offset) an address register (e.g., a register containing an address) or an instruction accessing an unchanged (e.g., unchanged since the address was previously outputted in a processor trace) register or (ii) accessing an absolute address (e.g., a global variable, local variable, or constant), then that address or addresses may be suppressed. Suppression (206) may include the generation of a suppressed address trace having no output for the unchanged register (e.g., removing from the address trace the address contained in the register such that there is no corresponding output) or for the relative address (e.g., removing from the address trace the relative address such that there is no corresponding output) and/or outputting a register hint packet. In one embodiment, the register hint packet includes at least one bit where a low value (e.g., 0) thereof means the register accessed in that executed instruction was unchanged (e.g., unchanged since the address was previously outputted in a processor trace) register. Alternatively, the register hint packet may include at least one bit where a high value (e.g., 1) thereof means the register accessed in that executed instruction was unchanged (e.g., unchanged since the address was previously outputted in a processor trace) register. In certain embodiments, the system or user will recognize a register hint bit is set (e.g., as a 0 or 1 as noted immediately above) to indicate an unchanged register, and the system or user may ascertain the addresses in that unchanged register from a previous output thereof (e.g., from an unsuppressed address trace packet or portion).

Suppression (206) may include the generation of a suppressed address trace packet including (e.g., only) the virtual address accessed by an executed instruction and a flag (e.g., a bit or bits) set to indicate the executed instruction accessed a register. An example of this is included below. A subsequently executed instruction that accessed the same, unchanged register may then only output a register hint packet, e.g., as described herein. Suppression (206) may include the generation of a suppressed address trace packet including the virtual address accessed by an executed instruction or a flag (e.g., a bit or bits) set to indicate the executed instruction accessed a register. A suppressed address trace packet may include the segment base, for example, if memory segmentation of the Intel® x86 instruction set architecture is used. Suppression (206) may include the generation of a suppressed address trace packet including (e.g., only) the linear address (e.g., equal to the virtual address plus a segment base) accessed by an executed instruction and a flag (e.g., a bit or bits) set to indicate the executed instruction accessed a register.

In one embodiment, an address in a register is not suppressed when a register is initially (e.g., in a section of code) accessed, but the address is suppressed in subsequent accesses that utilize that register. For example, in such an embodiment a decoder may determine the register value from the address rather than outputting a register hint packet.

In another embodiment, the register hint packet is the address stored in the address register. In yet another embodiment, the register hint packet is a compressed packet (e.g., a one byte (8 bits) packet instead of a 16, 32, 64 bits or greater sized address packet) that is predetermined to refer to that register, for example, outputting (e.g., a one byte packet indicating) the register name such as RAX (64 bits of storage), EAX (32 bits of storage), or AX (16 bits of storage). The outputted register name may be a predetermined address (e.g., of fewer bits than the address contained in the register) such that the system or user will recognize the address as indicating that an instruction accessed a specific register, but not outputting the contents of that specific register. That is, the output may be the name of the register and not the contents of the register. Suppression may include the suppressed address trace having no output for the absolute address (e.g., removing from the address trace the absolute address, such as the variable name or constant name (or the virtual address thereof), so that there is no corresponding output).

Although the checking of whether any addresses are suppressible 205 is depicted as after the write back 204, this disclosure is not so limited. For example, the checking 205 may occur after the execution 203. The data trace 207, e.g., a suppressed address trace, may then be outputted. Data trace may only include a suppressed address trace and no data value trace.

Figure 3:
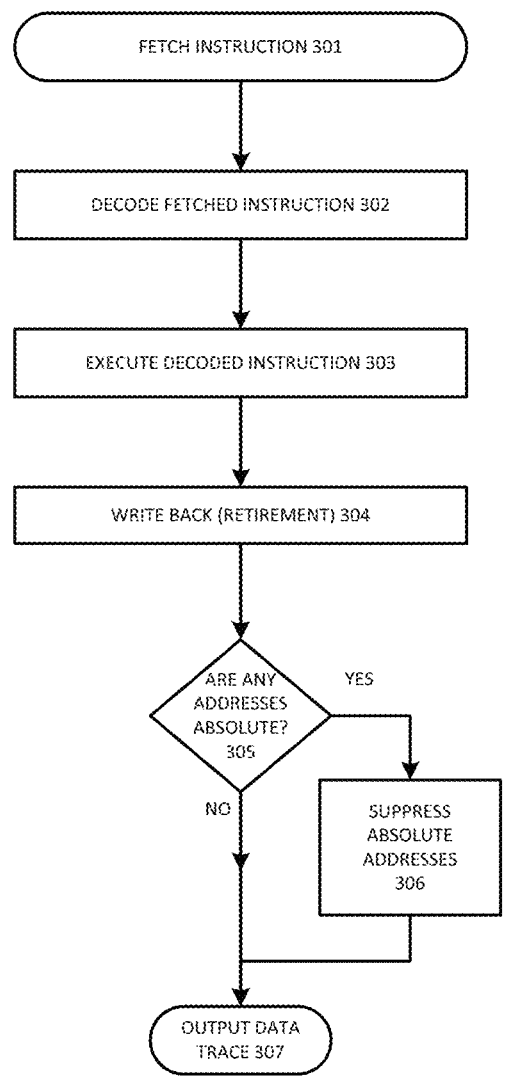
FIG. 3 illustrates an embodiment of a flow diagram of a suppressed address trace.

FIG. 3 illustrates an embodiment of a flow diagram of a suppressed address trace 300, e.g., within a processor. As depicted, an instruction is fetched 301, e.g., by a hardware instruction fetch unit. A fetched instruction is then decoded 302, e.g., by a hardware instruction decode unit. The decoded, fetched instruction is then executed 303, e.g., by a hardware execution unit. The executed instruction is then written back 304, for example, when the returned results are retired, e.g., by a hardware retirement unit. If there are any absolute addresses, such as an executed instruction accessing an absolute memory address (e.g., a global variable, local variable, or constant) 305, then that address or addresses may be suppressed. Suppression may include the suppressed address trace having no output for the absolute address, e.g., removing from the address trace the absolute address, such as the variable name or constant name, such that there is no corresponding output.

Although the checking of whether any addresses are absolute 305 is depicted as occurring after the write back 304, this disclosure is not so limited. For example, the checking 305 may occur after the execution 303. The data trace 307, e.g., including a suppressed address trace, may then be outputted.

Figure 4:
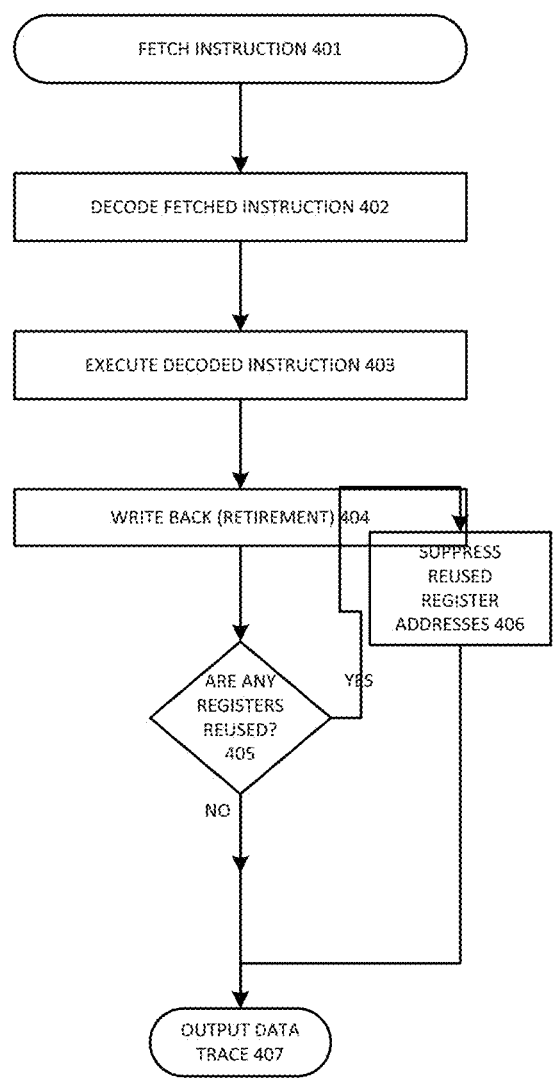
FIG. 4 illustrates an embodiment of a flow diagram of a suppressed address trace.

FIG. 4 illustrates an embodiment of a flow diagram of a suppressed address trace 400, e.g., within a processor. As depicted, an instruction is fetched 401, e.g., by a hardware instruction fetch unit. A fetched instruction is then decoded 402, e.g., by a hardware instruction decode unit. The decoded, fetched instruction is then executed 403, e.g., by a hardware execution unit. The executed instruction is then written back 404, for example, when the returned results are retired, e.g., by a hardware retirement unit. If there are any registers reused, such as an executed instruction accessing an unchanged (e.g., unchanged since the content (e.g., address) was outputted in a processor trace) register 405, then the address or addresses in the register may be suppressed. Suppression may include the suppressed address trace having no output for the unchanged register (e.g., removing from the address trace the address contained in the register such that there is no corresponding output) and/or outputting a register hint packet. Suppression may include sending, e.g., as a register hint packet, a data linear address (DLA) packet (e.g., the same number of bits as a non-suppressed DLA packet), but that replaces the address (e.g., the actual DLA is not included) with a single (e.g., address suppressed) bit set (e.g., to 1) to indicate suppression based on register reuse. That is, suppression may include outputting a DLA packet with the payload being a single or plurality of bits set to indicate suppression and not including the address. A register hint packet may be outputted instead of outputting the address in the register and/or instead of outputting a relative address that referenced (e.g., read from)

the register. In one embodiment, the register hint packet is the address (e.g., value) stored in the address register. In another embodiment, the register hint packet is a compressed packet (e.g., a one byte packet) that is predetermined to refer to that register, for example, outputting a bit(s) that indicate an unchanged register was accessed (e.g., so that the system or user may ascertain the addresses in that unchanged register from a previous output thereof, e.g., from an unsuppressed address trace packet or portion) and/or outputting the register name such as RAX (64 bits of storage), EAX (32 bits of storage), or AX (16 bits of storage). The outputted register name may be a predetermined address such that the system or user will recognize the address as indicating that an instruction accessed a specific register, but not outputting the contents of that specific register. That is, referring to the name of the register and not the contents of the register.

Although the checking of whether any registers are reused 405 is depicted as after the write back 404, this disclosure is not so limited. For example, the checking 405 may occur after the execution 403. The data trace 407, e.g., including a suppressed address trace, may then be outputted.

An apparatus, e.g., a processor, may include logic to achieve any of the disclosure herein. A processor may utilize logic to execute any single, combination, or all of the methods discussed herein, for example, logic to execute the flow diagrams in FIGS. 2, 3, and/or 4.

FIGS. 5(A)-(B) illustrate exemplary executions of suppressed address traces for a sample set of code (e.g., a stream of instructions) 501-525. This exemplary section of code uses a mixture of register based accesses (e.g., accessing address registers) and a few global variable addresses encoded into an instruction. FIGS. 5(A)-(B) illustrate three separate address traces marked with (1), (2), and (3), respectively: where (1) is no suppression of the address trace, (2) is suppression in the address trace of absolute addresses, and (3) is outputting register based hints for reused registers in the address trace as well as suppression in the address trace of absolute addresses. These traces are further simplified to only consider data linear addresses (DLAs) and to ignore data value (DV) tracing. (Note: the following assumes that the trace falls through each conditional jump and we do not account for the packet size of tracing the instruction itself). The unsuppressed packets considered here are a 1 byte header packet along with the full linear address of 8 bytes, which means each packet will be 9 bytes. In one embodiment, a suppressed address trace includes only outputting the header packet (e.g., for a suppressible address) and not the full linear (e.g., virtual) address when certain conditions are met, e.g., as in FIGS. 2, 3, and/or 4. In one embodiment, the header packet (e.g., the only packet outputted into the address trace for that executed instruction) includes the virtual address accessed and a flag (e.g., a bit or bits) set to indicate the executed instruction accessed a register (e.g., a register whose contents were not previously outputted into the address trace). In one embodiment, the header packet (e.g., the only packet outputted into the address trace for that executed instruction) includes the virtual address accessed or a flag (e.g., a bit or bits) set to indicate the executed instruction accessed a register (e.g., a register whose contents were not previously outputted into the address trace). In one embodiment, the header packet is suppressed to not include leading zeroes (e.g. if the address is only 4 byte then only send out 4 bytes of linear address instead of a larger than 4 byte full address). The outputted, suppressed address trace in such an embodiment may include the unsuppressed size of the linear address (e.g. as part of the header packet).

For all instructions here, note that reference character (1) refers to an address trace with no suppression, such that any address accessed is fully outputted into the address trace. One may assume a segment base of zero here, although the disclosure is not so limited. Turning to the move instruction ("mov") at line 501 of the sample 23 instruction trace in FIGS. 5(A)-5(B), first note that the "qword ptr" is a quad word (i.e., 64 bits) that points to (e.g., begins) at the address indicated at the relative address given by adding the address register contents of RCX and 18h (here, h means that 18 is in the hexadecimal numeral system) within the square brackets. Address register RCX contains (e.g., stores) the address 0x7F0000 here, so the qword to be moved into RDX is that which is stored at a location in memory beginning with 0x7F0000 plus 18h, that is, at memory location 0x7F0018. As another example, the unsuppressed address trace (1) for the move instruction at line 502 outputs the address 0x7F0000 here as that instruction accessed the qword stored at a location in memory beginning with 0x7F0000. As one of ordinary skill in the art appreciates, the above similarly applies to the remaining instructions.

At line 501, consider that the address contained in register RCX has not been previously outputted (e.g., that the address trace is beginning at line/instruction 501). For suppressed address trace (2), i.e., suppression in the address trace of absolute addresses, there are no absolute addresses in this instruction, so no suppression of the address trace such that trace (1) and (2) are the same, i.e., 0x7F0018 which is the relative address accessed by the instruction. For suppressed address trace (3), i.e., outputting in the address trace of register based hints (such as the address stored in the address register) for reused registers as well as suppression in the address trace of absolute addresses, the address 0x7F0000 contained in register RCX is output as a register hint packet (e.g., as a hint to a user and/or code that a relative address in that instruction referenced, e.g., utilized, that address register) because the address 0x7F0000 has not been previously outputted into this trace. The instructions may be run in order or out of order, e.g., as is discussed herein.

Move instruction 502 also accesses a qword being pointed to by the address stored in register RCX, to move that qword into register RAX. For suppressed address trace (2), there are no absolute addresses in this instruction so no suppression of the address trace such that trace (1) and (2) are the same, i.e., 0x7F0000, which is the address in register RCX that is accessed by the instruction. For suppressed address trace (3), no data (e.g., no packet) is output into the data trace (i.e., there is suppression) for the address 0x7F0000 contained in register RCX as it was previously output into the address trace in (3) of instruction 501, that is, because the address 0x7F0000 in RCX was previously outputted into this trace and the value in register RCX has not changed relative to the value of RCX in instruction 501 (e.g., the value is the same in the current instruction as at the end of the execution of previous instruction 501).

Exclusive OR (XOR) instruction 503 does not access an address, it merely XORs the contents of register ESI with itself and stores the result back into ESI so no address trace (1)-(3) is generated.

Subtract instruction 504 accesses a qword being pointed to by the address 0x7F60000 stored in register RDX plus 21B0h, i.e., 0x7F621B0, which is the relative address accessed by the instruction. The qword is subtracted from the value in RAX and the result stored into RAX. For suppressed address trace (2), there are no absolute addresses in this instruction so no suppression of the address trace such that trace (1) and (2) are the same, i.e., 0x7F621B0, which is the relative address from adding 21B0h to the value in register RDX. For suppressed address trace (3), the address 0x7F60000 contained in register RDX is output as a register hint packet (e.g., as a hint to a user and/or code that a relative address in that instruction referenced, e.g., utilized, that address register) because the address 0x7F60000 from register RDX has not been previously outputted into this trace.

Move instruction 505 does not access an address, it merely moves the contents of register RCX to RBX so no address trace (1)-(3) is generated.

Move instruction 506 moves the value in register RAX into the quad word (i.e., 64 bits) that begins at the address indicated at the relative address given by adding the 0x7F60000 address stored in RDX and 0A20h (again, h means in the hexadecimal numeral system), i.e., the qword that begins at address 0x7F60A20. For suppressed address trace (2), there are no absolute addresses in this instruction, so no suppression of the address trace such that trace (1) and (2) are the same, i.e., 0x7F60A20, which is the relative address accessed by the instruction. For suppressed address trace (3), no data (e.g., no packet) is output into the data trace (i.e., there is suppression) for the address 0x7F60000 contained in register RDX as it was previously output into the address trace in (3) of instruction 504, that is, because the address 0x7F60000 in RDX was previously outputted into this trace and the value in register RDX has not changed relative to the value of RDX in instruction 504 (e.g., the value is the same in the current instruction as at the end of the execution of previous instruction 504).

Move instruction 507 moves the quad word (i.e., 64 bits) that begins at the address indicated at the relative address given by adding the 0x7F0000 address stored in RCX and 10h, i.e., the qword that begins at address 0x7F0010. For suppressed address trace (2), there are no absolute addresses in this instruction, so no suppression of the address trace such that trace (1) and (2) are the same, i.e., 0x7F0010, which is the relative address accessed by the instruction. For suppressed address trace (3), no data (e.g., no packet) is output into the data trace (i.e., there is suppression) for the address 0x7F0000 contained in register RCX as it was previously output into the address trace in (3) of instruction 501, that is, because the address 0x7F0000 in RCX was previously outputted into this trace and the value in register RCX has not changed relative to the value of RCX in instruction 501 (e.g., the value is the same in the current instruction as at the end of the execution of previous instruction 501).

Compare instruction ("cmp") 508 accesses a dword (i.e., a double word of 32 bits) being pointed to by the address stored in the code as the global variable named "GlobalVariableOne". It then subtracts the value in register ESI from the dword. For (1), the address for "GlobalVariableOne" is output into the address trace. For suppressed address trace (2), there is an absolute address in this instruction so no data (e.g., no packet) is output into the data trace (i.e., there is suppression) for the address for "GlobalVariableOne". For suppressed address trace (3), there is also no access of an (e.g., unchanged) address contained in a register, in addition to there being an absolute address in this instruction, so no data (e.g., no packet) is output into the data trace (i.e., there is suppression) for this instruction under suppressed traces (2) and (3).

Jump if below or equal instruction ("jbe") 509 does not access an address, it merely jumps to the labeled FirstBranch line of the code if the first operand was less than or equal to the second operand in the compare instruction 508, so no address trace (1)-(3) is generated.

Move instruction 510 accesses a dword being pointed to by the address stored as the global variable named "GlobalVariableTwo". It then moves that dword into register EDI. For (1), the address for "GlobalVariableTwo" is output into the address trace. For suppressed address trace (2), there is an absolute address in this instruction so no data (e.g., no packet) is output into the data trace (i.e., there is suppression) for the address for "GlobalVariableTwo". For suppressed address trace (3), there is also no access of an (e.g., unchanged) address contained in a register, in addition to there being an absolute address in this instruction, so no data (e.g., no packet) is output into the data trace (i.e., there is suppression) for this instruction under suppressed traces (2) and (3).

Move instruction 511 accesses a qword being pointed to by the address 0x61F000 stored in register RBX plus 18h, i.e., 0x61F018, which is the relative address accessed by the instruction. The qword is then moved into register RCX. For suppressed address trace (2), there are no absolute addresses in this instruction so no suppression of the address trace such that trace (1) and (2) are the same, i.e., 0x61F018, which is the relative address referencing, e.g., accessing, register RBX that is accessed by this instruction. For suppressed address trace (3), the address 0x61F000 contained in register RBX is output as a register hint packet (e.g., as a hint to a user and/or code that a relative address in that instruction referenced, e.g., utilized, that address register) because the address 0x61F000 from register RBX has not been previously outputted into this trace.

Compare instruction 512 accesses a qword (i.e., a quad word of 64 bits) that begins at the address indicated at the relative address given by adding the 0x7F0000 value stored in register RCX and the 100h (again, h means in the hexadecimal numeral system) value stored in register RDI, i.e., the qword that begins at address 0x7F0100. It then subtracts the immediate value of zero (i.e., 0) from the qword. For (1), (2), and (3) the relative address of 0x7F0100 is output. In this embodiment, for suppressed trace (2) there are no absolute addresses in this instruction, so no suppression of the address trace such that trace (1) and (2) are the same. For suppressed trace (3), there are two registers utilized to generate the relative address such that a single register hint packet might not allow ascertainment of which register the register hint packet refers. Accordingly, in such embodiments using a complex address (e.g., using more than one register to determine the address), the address may not be suppressed as illustrated in (3) here. In one embodiment, an address is suppressed when it is a simple address, e.g., not accessing more than one register.

Instruction jump when equal ("je") 513 does not access an address, it merely jumps to the labeled FirstSkip line of the code if the first operand was equal to the second operand in the compare instruction 512, so no address trace (1)-(3) is generated.

Move instruction 514 accesses a qword (i.e., a quad word of 64 bits) that begins at the address indicated at the relative address given by adding the 0x7F0000 value stored in register RCX and the 100h (again, h means in the hexadecimal numeral system) value stored in register RDI, i.e., the qword that begins at address 0x7F0100. It then moves the qword to register RCX. For (1), (2), and (3) the relative address of 0x7F0100 is output. In this embodiment, for suppressed trace (2) there are no absolute addresses in this instruction, so no suppression of the address trace such that trace (1) and (2) are the same. For suppressed trace (3), there are two registers utilized to generate the relative address such that a single register hint packet might not allow ascertainment of which register the register hint packet refers. Accordingly, in such embodiments using a complex address (e.g., using more than one register to determine the address), the address may not be suppressed as illustrated in (3) here.

Move instruction 515 accesses a qword being pointed (e.g., beginning with) at by the address stored in register RBX, to move that qword into register RAX. For suppressed address trace (2), there are no absolute addresses in this instruction so no suppression of the address trace such that trace (1) and (2) are the same, i.e., 0x61F000, which is the address in register RBX that is accessed by the instruction. For suppressed address trace (3), no data (e.g., no packet) is output into the data trace (i.e., there is suppression) for the address 0x61F000 contained in register RBX as it was previously output into the address trace as a register hint packet in (3) of instruction 511 that is, because the address 0x61F000 in RBX was previously outputted into this trace and the value in register RBX has not changed relative to the value of RBX in instruction 511 (e.g., the value is the same in the current instruction as at the end of the execution of previous instruction 511).

Compare instruction 516 accesses a qword (i.e., a quad word of 64 bits) that begins at the address indicated at the relative address given by adding the 0x7F0000 value stored in register RCX and the 8 immediate value, i.e., the qword that begins at address 0x7F0008. It then subtracts the value in register RAX (i.e., 0x61F000) from the qword. For suppressed address trace (2), there are no absolute addresses in this instruction so no suppression of the address trace such that trace (1) and (2) are the same, i.e., 0x7F0008, which is the relative address accessed by the instruction. For suppressed address trace (3), no data (e.g., no packet) is output into the data trace (i.e., there is suppression) for the address 0x7F0000 contained in register RCX as it was previously output into the address trace in (3) of instruction 501 that is, because the address 0x7F0000 in RCX was previously outputted into this trace and the value in register RCX has not changed relative to the value of RCX in instruction 501 (e.g., the value is the same in the current instruction as at the end of the execution of previous instruction 501).

Instruction jump when not equal ("jne") 517 does not access an address, it merely jumps to the labeled FirstSkip line of the code if the first operand was not equal to the second operand in the compare instruction 516, so no address trace (1)-(3) is generated.

Line 518 is the FirstBranch label for the code, e.g., identifying where instruction 509 will jump if the conditions for the jbe 509 are met, so no address trace (1)-(3) is generated since no addresses are accessed.

Move instruction 519 moves the quad word that begins at the address indicated at the relative address given by adding the 0x61F000 address stored in RBX and the immediate value of 18h, i.e., the qword that begins at address 0x61F018, into register RAX. For suppressed address trace (2), there are no absolute addresses in this instruction, so no suppression of the address trace such that trace (1) and (2) are the same, i.e., 0x61F018, which is the relative address accessed by the instruction. For suppressed address trace (3), no data (e.g., no packet) is output into the data trace (i.e., there is suppression) for the address 0x61F000 contained in register RBX as it was previously output into the address trace in (3) of instruction 511, that is, because the address 0x61F000 in RBX was previously outputted into this trace and the value in register RBX has not changed relative to the value of RBX in instruction 511 (e.g., the value is the same in the current instruction as at the end of the execution of previous instruction 511).

Move instruction 520 moves the value in register ESI into a dword being pointed to by the address 0x51500000 stored in register RAX plus 0A28h, i.e., 0x51500A28, which is the relative address accessed by the instruction. For suppressed address trace (2), there are no absolute addresses in this instruction so no suppression of the address trace such that trace (1) and (2) are the same, i.e., 0x51500A28, which is the relative address referencing register RAX that is accessed by this instruction. For suppressed address trace (3), the address 0x51500000 contained in register RAX is output as a register hint packet (e.g., as a hint to a user and/or code that a relative address in that instruction referenced, e.g., utilized, that address register) because the address 0x51500000 from register RAX has not been previously outputted into this trace.

Move instruction 521 moves the quad word that begins at the address indicated at the relative address given by adding the 0x61F000 address stored in RBX and 20h, i.e., the qword that begins at address 0x61F020. For suppressed address trace (2), there are no absolute addresses in this instruction, so no suppression of the address trace such that trace (1) and (2) are the same, i.e., 0x61F020, which is the relative address accessed by the instruction. For suppressed address trace (3), no data (e.g., no packet) is output into the data trace (i.e., there is suppression) for the address 0x61F000 contained in register RBX as it was previously output into the address trace in (3) of instruction 511, that is, because the address 0x61F000 in RBX was previously outputted into this trace and the value in register RBX has not changed relative to the value of RBX in instruction 511 (e.g., the value is the same in the current instruction as at the end of the execution of previous instruction 511).

Move instruction 522 moves the quad word that begins at the address indicated at the relative address given by adding the 0x61F000 address stored in RBX and 18h, i.e., the qword that begins at address 0x61F018. For suppressed address trace (2), there are no absolute addresses in this instruction, so no suppression of the address trace such that trace (1) and (2) are the same, i.e., 0x61F018, which is the relative address accessed by the instruction. For suppressed address trace (3), no data (e.g., no packet) is output into the data trace (i.e., there is suppression) for the address 0x61F000 contained in register RBX as it was previously output into the address trace in (3) of instruction 511, that is, because the address 0x61F000 in RBX was previously outputted into this trace and the value in register RBX has not changed relative to the value of RBX in instruction 511 (e.g., the value is the same in the current instruction as at the end of the execution of previous instruction 511).

Move instruction 523 accesses a qword being pointed (e.g., beginning with) at by the address stored in register RAX, to move that qword into register RCX. For suppressed address trace (2), there are no absolute addresses in this instruction so no suppression of the address trace such that trace (1) and (2) are the same, i.e., 0x51500000, which is the address in register RAX that is accessed by the instruction. For suppressed address trace (3), no data (e.g., no packet) is output into the data trace (i.e., there is suppression) for the address 0x51500000 contained in register RAX as it was previously output into the address trace in (3) of instruction 520 as a register hint packet, that is, because the address 0x51500000 in RAX was previously outputted into this trace and the value in register RAX has not changed relative to the value of RAX in instruction 520 (e.g., the value is the same in the current instruction as at the end of the execution of previous instruction 520).

Instruction 524 adds the value in register RDX and the immediate value of 0A20h, so no address trace (1)-(3) is generated as no addresses are accessed (e.g., no address is pulled from a register or memory location).

Line 525 is the FirstSkip label for the code, e.g., identifying where instructions 513 and 517 will jump if the conditions for a jump is met, so no address trace (1)-(3) is generated since no addresses are accessed.

A summary of the statistics for the above address traces is in "Table 1: Address Traces" below. Particularly, note the total data space savings for suppressed trace (3) generates only 65% of the original, unsuppressed address trace (1). A smaller sized trace may allow faster output of the trace, e.g., faster writing to a file, e.g., to memory, and/or to a port.

TABLE 1

Address Traces

| Method | Number of Possible Packets to Output | Number of Packets Output | Number of Packets Suppressed | Total Bytes Output with Suppression |
|---|---|---|---|---|
| (1) No Suppression | 17 | 17 | 0 | 153 Bytes |
| (2) Absolute Address Suppression | 17 | 15 | 2 | 135 Bytes |
| (3) Absolute Address Suppression and Register Hint | 17 | 6 | 11 | 54 Bytes |

In one embodiment, a trace suppressor outputs a suppressed address trace of executed instructions. The suppressed address trace may include an output packet containing the (e.g., virtual) address stored in the address register that is accessed by a first executed instruction. The output packet may include a register hint packet that includes a register flag indicating that a register was accessed. A second executed instruction may access the same address register as in the first executed instruction, and if the address stored in the address register is unchanged relative to the first instruction, the suppressed address trace may include no output for the second executed instruction. Additionally or alternatively, a second executed instruction may access a relative address referencing the same address register as in the first executed instruction, and if the address stored in the address register is unchanged relative to the first instruction, the output packet of the suppressed address trace may include a register hint packet for the second executed instruction. A first executed instruction may access an address register, and the suppressed address trace may include a register hint packet of the output packet outputted for the first executed instruction.

For example, note the three segments of executed instruction examples below in Tables 2-4 and the corresponding suppressed output packets. Note the virtual addresses (VA) used below are examples and any size or format of address may be used (including with or without a segment base). Output Packet may be one byte or a plurality of bytes. A register flag may indicate that an instruction accessed an (e.g., address) register. Register flag in the Output Packet may include a bit or bits that correspond to that instruction accessing a register, e.g., a bit or bits that are predetermined to indicate a register access. In one embodiment, the register flag is the first or last bit of the output packet.

Table 2 below illustrates an embodiment where: for the first instruction (move instruction MOV [EAX]) the output packet of the suppressed trace includes the virtual address (e.g., 1000 here) since this is the first time in this section of code that register EAX has been accessed. A register flag, e.g., as discussed above, is also set to indicate that a register was accessed by the first instruction. The second instruction (MOV EBX) also accesses register EAX, whose contents are unchanged relative to its contents as outputted for the first instruction, so that the virtual address and the register flag are not outputted, instead a one byte hint packet is outputted wherein at least one of the bits of the byte are set to indicate the contents of the register are unchanged relative to its contents as outputted for the previous (e.g., first) instruction. This indicates to a system or user to look at the previous (e.g., trace) output for that address, e.g., without generating an unsuppressed address trace. Instruction three (MOV ECX) also accesses register EAX, whose contents are unchanged relative to its contents as outputted for the first instruction, so that the virtual address and the register flag are not outputted, instead a one byte hint packet is outputted wherein at least one of the bits of the byte are set to indicate the contents of the register are unchanged relative to its contents as outputted for the previous (e.g., first) instruction. This indicates to a system or user to look at the previous output for the address, e.g., without generating an unsuppressed address trace. Instruction four (MOV [EDX]) accesses a new register (e.g., EDX here), such that the output packet of the suppressed trace includes the virtual address (e.g., 1000 here) as this is the first time in this section of code that register EAX has been accessed. A register flag, e.g., as discussed above, is also set to indicate that a register was accessed by the fourth instruction. In such an embodiment, a register hint packet is output for each instruction that is suppressed.

TABLE 2

| Instruction | Output Packet |
|---|---|
| MOV [EAX], 1 | Virtual Address (VA): 1000 and a Register Flag |
| MOV EBX, [EAX + 100] | 1 Byte Register Hint packet |
| MOV ECX, [EAX + 200] | 1 Byte Register Hint packet |
| MOV [EDX], 3 | VA: 2000 and a Register Flag |

Table 3 below illustrates an embodiment where the first four instructions are the same as those in Table 2. However, in instruction two in Table 3, there is no outputted packet (e.g., no register hint packet is outputted), instead the subsequent instructions (e.g., in order) are checked to see if the same (or previously outputted and unchanged register value) register is accessed and additional bits are set (e.g., in a counter). Here, a first bit is set to serve as a register hint packet but it is not output immediately after that instruction. Instruction three also access register EAX (having unchanged contents relative to the first instruction) so a second bit is set to serve as a register hint packet. As instruction four does not access the same, unchanged register, the register hint packet is then output with two bits set. Accordingly, if more than two consecutive instructions accessed an unchanged (relative to the immediately previously outputted value) register, then the same number of bits may be set to serve as a register hint packet when output. For example, see in instruction seven, a register hint packet is output as the previous three (e.g., including the immediately previous executed instruction MOV EBI) all accessed unchanged registers EAX and EDX.

In such an embodiment, certain instructions may not include an outputted Output Packet, and instead a register hint packet may be output with a bit set for each instruction that accessed a previously outputted, unchanged register. Such a register hint packet may be output immediately previous to the next instruction that accesses a changed value (e.g., new) register, for example, as in Table 3.

TABLE 3

| Instruction | Output Packet |
|---|---|
| MOV [EAX], 1 | VA: 1000 and a Register Flag |
| MOV EBX, [EAX + 100] | {no output} |
| MOV ECX, [EAX + 200] | Register Hint packet with 2 bits set, rest are clear. |
| MOV [EDX], 3 | VA: 2000 and a Register Flag |
| MOV ESI, [EAX + 300] | {no output} |
| MOV EDI, [EDX + 400] | {no output} |
| MOV EBI, [EAX + 400] | Register Hint packet with 3 bits set, rest are clear. |
| MOV [ECX], 3 | VA: 3000 and a Register Flag |

Table 4 below illustrates an embodiment where all eight instructions are the same as those in Table 3. The first time a register with a current value that has not been previously outputted is accessed as in instruction one (MOV [EAX]), the Output Packet was outputted as per the examples in Tables 2 and 3 above. However, instead of outputting a register hint packet after an instruction accesses an unchanged value (e.g., previously outputted) register as in instruction two (MOV EBX), the trace (e.g., from trace suppressor) includes an Output Packet that is output after a subsequent section of code is executed. As shown here, the register hint packet includes a bit for each corresponding, executed instruction such that a set bit (e.g., a 1) corresponds to a previously output and since unchanged register value and a cleared bit (e.g., a 0) corresponds to a new value for that register or a first use of a new register, although the opposite convention may be used.

A 7 bit register hint packet is illustrated here, however any number of bits may be used. Register hint packet is illustrated as a plurality of bits, with each bit being set meaning a suppressed address for a respective instruction and each bit being clear meaning a not suppressed address for a respective instruction. Such a hint packet may be referred to as an "ASNS" (Address Suppressed or Not Suppressed) packet.

Although the suppressed Output Packet is shown as being output immediately after the last instruction (e.g., instruction eight MOV [ECX]) in a section of code, the output may occur at any time, e.g., at or after a set number of processor cycles or at or after a set number of instructions have been executed (e.g., continually generate outputs after 8, 16, 32, 64, etc. instructions are executed). Additionally, after the subsequent section of code is executed, an output packet may also be output, e.g., in Table 4: the subsequent output packets for (i) virtual address (VA) 2000 and a Register Flag corresponding to the MOV [EDX] instruction and (ii) the VA: 3000 and a Register Flag corresponding to the MOV [ECX] instruction were outputted. The register hint packet (s) may be output before or after the output of the subsequent output packet(s). In such an embodiment, a register hint packet may be output at intervals that include a change in the value of a register and/or a use of a new (e.g., not yet outputted) register. This may include the output of such a register hint packet (which may be one byte or multiple bytes) for a plurality of executed instructions and output packets of the virtual addresses (e.g., 2000 and 3000 here) since this is the first time in this section of code that address registers EDX and ECX have been accessed. A register flag, e.g., as discussed above, may also be set to indicate that a register was accessed by that instruction, e.g., as shown in Table 4 below.

TABLE 4

| Instruction | Output Packet |
|---|---|
| MOV [EAX], 1 | VA: 1000 and a Register Flag |
| MOV EBX, [EAX + 100] | {no output yet} |
| MOV ECX, [EAX + 200] | {no output yet} |
| MOV [EDX], 3 | {no output yet} |
| MOV ESI, [EAX + 300] | {no output yet} |
| MOV EDI, [EDX + 400] | {no output yet} |
| MOV EBI, [EAX + 400] | {no output yet} |
| MOV [ECX], 3 | Register Hint packet:<br>bit 0: set (corresponding to the MOV EBX instruction)<br>bit 1: set (corresponding to the MOV ECX instruction)<br>bit 2: clear (corresponding to the MOV [EDX] instruction)<br>bit 3: set (corresponding to the MOV ESI instruction)<br>bit 4: set (corresponding to the MOV EDI instruction)<br>bit 5: set (corresponding to the MOV EBI instruction)<br>bit 6: clear (corresponding to the MOV [ECX] instruction)<br>VA: 2000 and a Register Flag (corresponding to the MOV [EDX] instruction)<br>VA: 3000 and a Register Flag (corresponding to the MOV [ECX] instruction) |

In one embodiment, a processor includes a hardware execution unit to execute instructions, a hardware retirement unit to retire executed instructions, and a trace generator having a trace suppressor to output a suppressed address trace of the executed instructions. In another embodiment, a processor includes a core and a trace generator having a trace suppressor to output a suppressed address trace of executed instructions. A (e.g., suppressed) address trace may be outputted before or after the executed instructions to be traced are retired. A first executed instruction may access an address register and the suppressed address trace includes an address stored in the address register outputted for the first executed instruction. A second executed instruction may access the same address register, the address stored in the address register is unchanged relative to the first instruction, and the suppressed address trace includes no output or a suppressed output for the second executed instruction. In one embodiment, the value in the register accessed by the second instruction is unchanged relative to the value in that same register previously accessed by first instruction. Access here may include reading of a value from the register or memory location. In one embodiment, e.g., wherein a first executed instruction accessed an address register, the suppressed address trace may include the address stored in the register or the address that was accessed. In the latter case, the decoder (e.g., hardware and/or software) may determine the value in the register. For example, if [ECX+018h] is accessed by an instruction and ECX holds 0x11000, then the suppressed address trace may include a packet output with a value of 0x11018. In such an embodiment, the decoder may determine the register value using the previous trace information and the disassembled binary code.

A second executed instruction may access a relative address referencing the address register, the address stored in the address register is unchanged relative to the first instruction, and the suppressed address trace includes a register hint packet outputted for the second executed instruction. The second instruction can execute after the first instruction, or the instructions may execute out of order. A register hint packet may include the address stored in the address register.

A first executed instruction may access a relative address referencing an address register, and the suppressed address trace includes a register hint packet outputted for the first executed instruction. A register hint packet may include an address stored in the address register. A processor may include a trace suppressor that selectively does not output data or only outputs compressed data in a suppressed address trace for any executed instruction that accessed an absolute memory address. A retirement unit of a processor may include a re-order buffer.

A memory address may be main memory or cache memory. A memory may be absolute. Memory may include any machine-readable storage media having an address, and may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

In one embodiment, a method to generate a suppressed address trace for a processor includes executing instructions with a hardware execution unit of the processor, retiring executed instructions with a hardware retirement unit of the processor, and generating the suppressed address trace of the executed instructions from a trace suppressor of a trace generator of the processor. In another embodiment, a method to generate a suppressed address trace for a processor includes executing instructions in a core of the processor, and generating the suppressed address trace of the executed instructions from a trace suppressor of a trace generator of the processor. An (e.g., suppressed) address trace may be outputted before or after the executed instructions to be traced are retired. The method may include, wherein a first executed instruction accessed an address register, generating the suppressed address trace comprises outputting an address stored in the address register for the first executed instruction. The method may include, wherein a second executed instruction accessed the address register and the address stored in the address register is unchanged relative to the first instruction, generating the suppressed address trace by outputting no data (e.g., no output) for the second executed instruction. The method may include executing the first instruction before or after the second executed instruction. The method may include, wherein a second executed instruction accessed a relative address referencing the address register and the address stored in the address register is unchanged relative to the first instruction, generating the suppressed address trace comprises outputting a register hint packet for the second executed instruction. A register hint packet including (e.g., only including) the address stored in the address register may be outputted in the suppressed address trace. The method may include, wherein a first executed instruction accessed a relative address referencing an address register, generating the suppressed address trace by outputting a register hint packet for the first executed instruction. The register hint packet may include (e.g., only include) an address stored in the address register. A method may include, wherein at least one executed instruction accessed an absolute memory address, generating the suppressed address trace by outputting no data (e.g., no output) for the at least one executed instruction. Generating a suppressed address trace may include no trace being output for an executed instruction, e.g., as above, or a reduced trace being output for an executed instruction, such as only outputting a register hint packet that has a suppressed address, e.g., as above.

In one embodiment, a machine readable storage medium includes code that, when executed, causes a machine to perform any single or combination of the above methods.

In another embodiment, a non-transitory machine readable storage medium has instructions that, when executed, causes a machine to perform a method that includes generating a suppressed address trace of executed instructions from a trace suppressor of a trace generator of a processor. The non-transitory machine readable storage medium, wherein a first executed instruction accessed an address register, wherein generating the suppressed address trace includes outputting an address stored in the address register for the first executed instruction. The non-transitory machine readable storage medium, wherein a second executed instruction accessed the address register and the address stored in the address register is unchanged relative to the first instruction, wherein generating the suppressed address trace includes outputting (e.g., not producing) no output for the second executed instruction or a suppressed output. The non-transitory machine readable storage medium of claim 23, wherein a second executed instruction accessed a relative address referencing the address register, the address stored in the address register is unchanged relative to the first instruction, and generating the suppressed address trace comprises outputting a register hint packet for the second executed instruction. The non-transitory machine readable storage medium, wherein the register hint packet includes the address stored in the address register. The non-transitory machine readable storage medium, wherein a first executed instruction accessed a relative address referencing an address register, wherein generating the suppressed address trace includes outputting a register hint packet for the first executed instruction. The non-transitory machine readable storage medium wherein the register hint packet comprises an address stored in the address register. The non-transitory machine readable storage medium, wherein at least one executed instruction accessed an absolute memory address, and generating the suppressed address trace includes no output for the at least one executed instruction or a suppressed output.

In one embodiment, a processor includes means to execute instructions, means to retire executed instructions, and means to generate a suppressed address trace of the executed instructions. In another embodiment, a processor includes means to execute instructions and means to generate a suppressed address trace of the executed instructions. The means to generate the suppressed address trace may include means to selectively output an address stored in an address register accessed by an executed instruction. The means to generate the suppressed address trace may include means to not output data for an address stored in an address register accessed by an executed instruction. The means to generate the suppressed address trace may include means to selectively output an absolute memory address accessed by an executed instruction. The means to generate the suppressed address trace may include means to not output data for an absolute memory address accessed by an executed instruction. The means to generate the suppressed address trace may include means to output a register hint packet for an executed instruction that accessed a relative address referencing an address register. The means to generate the suppressed address trace comprises means to not output data for an executed instruction that accessed a relative address referencing an address register.

Figure 6:
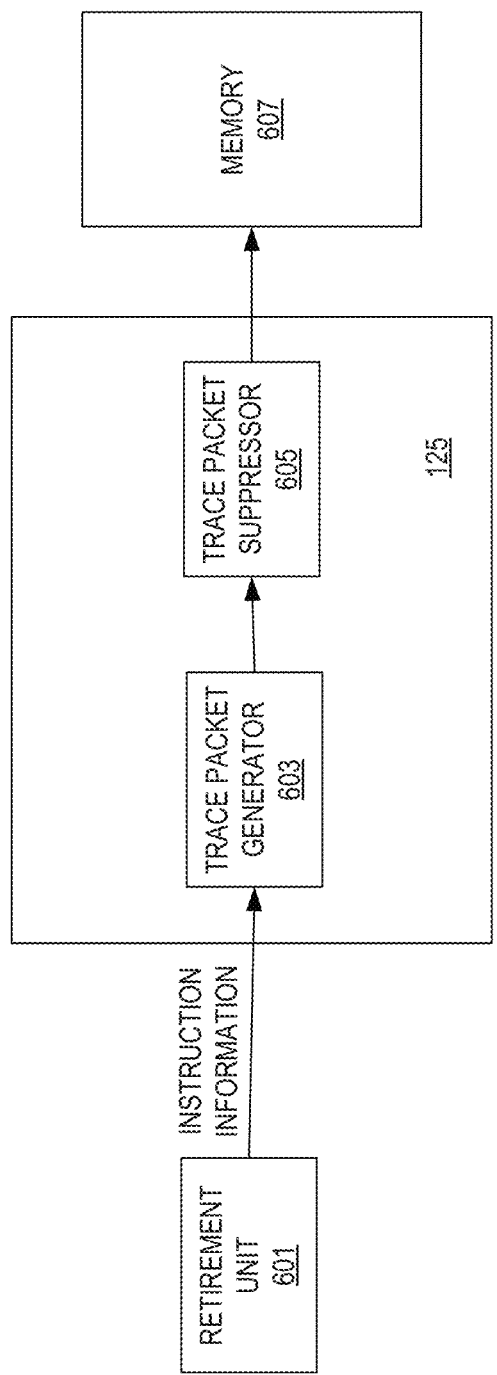
FIG. 6 illustrates a block diagram of an exemplary architecture using a trace generator.

FIG. 6 illustrates a block diagram of an exemplary architecture using a trace generator 125. Depicted retirement unit 601 retires an executed instruction and sends the information about the retired instruction to the trace generator 125. Particularly, the retired instruction's information is sent to a trace packet generator 603 of the trace generator 125 that generates the (e.g., address) trace and a trace packet suppressor 605 of the trace generator 125 to suppress the trace packet and output a suppressed (e.g., address) trace of the executed instruction into memory 607.

Exemplary Register Architecture

Figure 7:
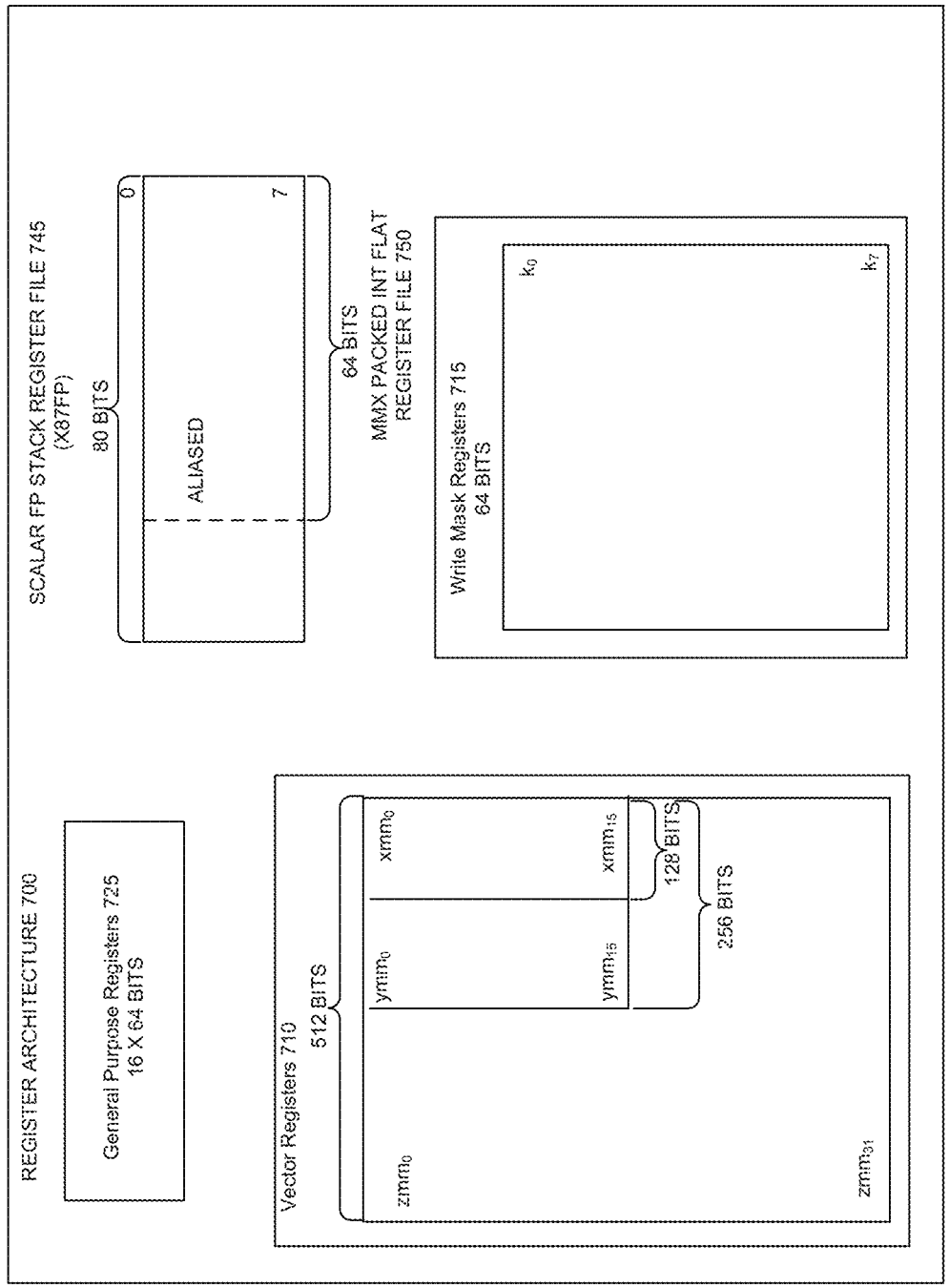
FIG. 7 is a block diagram of a register architecture 700 according to one embodiment of the invention.

FIG. 7 is a block diagram of a register architecture 700 according to one embodiment of the invention. In the embodiment illustrated, there are 32 vector registers 710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

In other words, the vector length field selects between a maximum length and one or more other shorter lengths, where each such shorter length is half the length of the preceding length; and instructions templates without the vector length field operate on the maximum vector length. Further, in one embodiment, the class B instruction templates of the specific vector friendly instruction format operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 715—in the embodiment illustrated, there are 8 write mask registers (k0 through k7), each 64 bits in size. In an alternate embodiment, the write mask registers 715 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 745, on which is aliased the MMX packed integer flat register file 750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/ execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 9B:
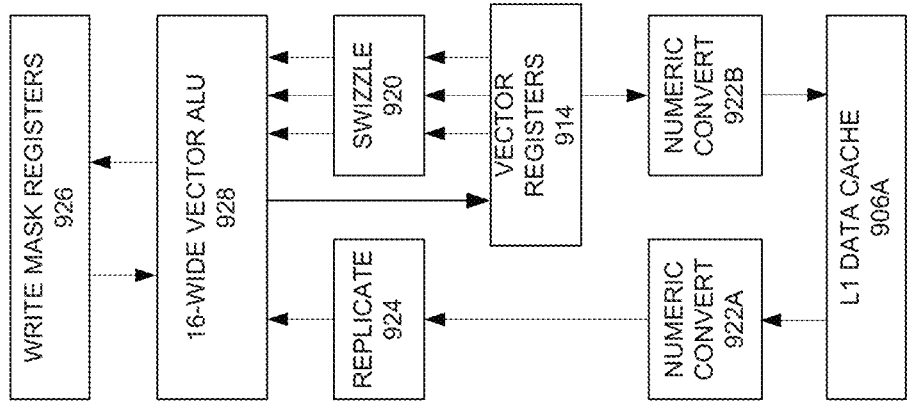
FIG. 9B is an expanded view of part of the processor core in FIG. 9A according to embodiments of the invention.
Figure 9A:
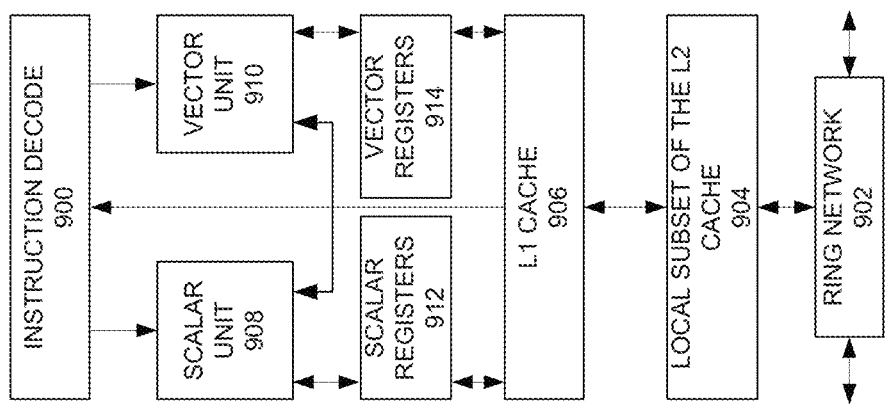
FIG. 9A is a block diagram of a single processor core, along with its connection to the on-die interconnect network and with its local subset of the Level 2 (L2) cache, according to embodiments of the invention.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 912-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

A trace generator may be included in a processor and/or core, for example, the processor(s) and/or core(s) in FIGS. 10-13.

Processor with Integrated Memory Controller and Graphics

Figure 10:
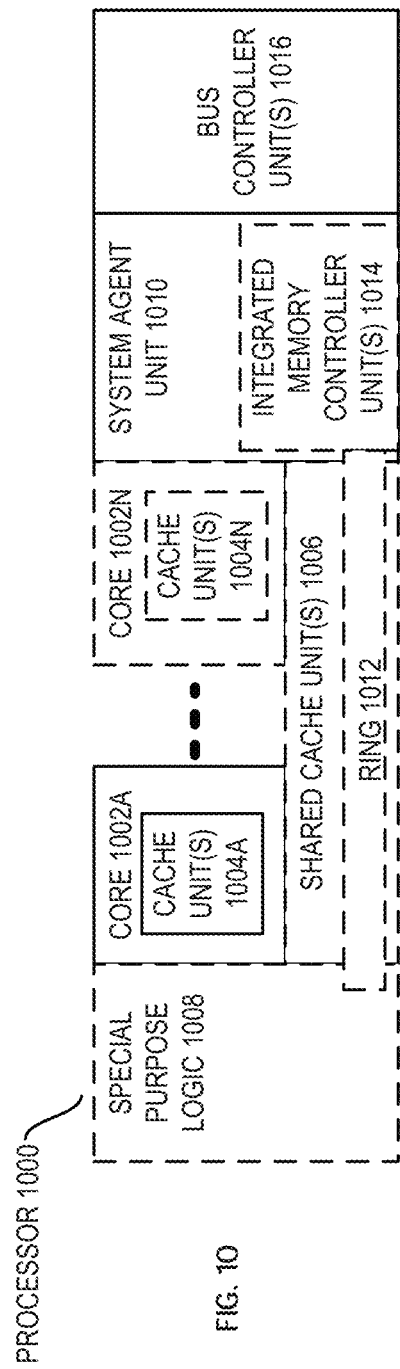
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

Figure 11:
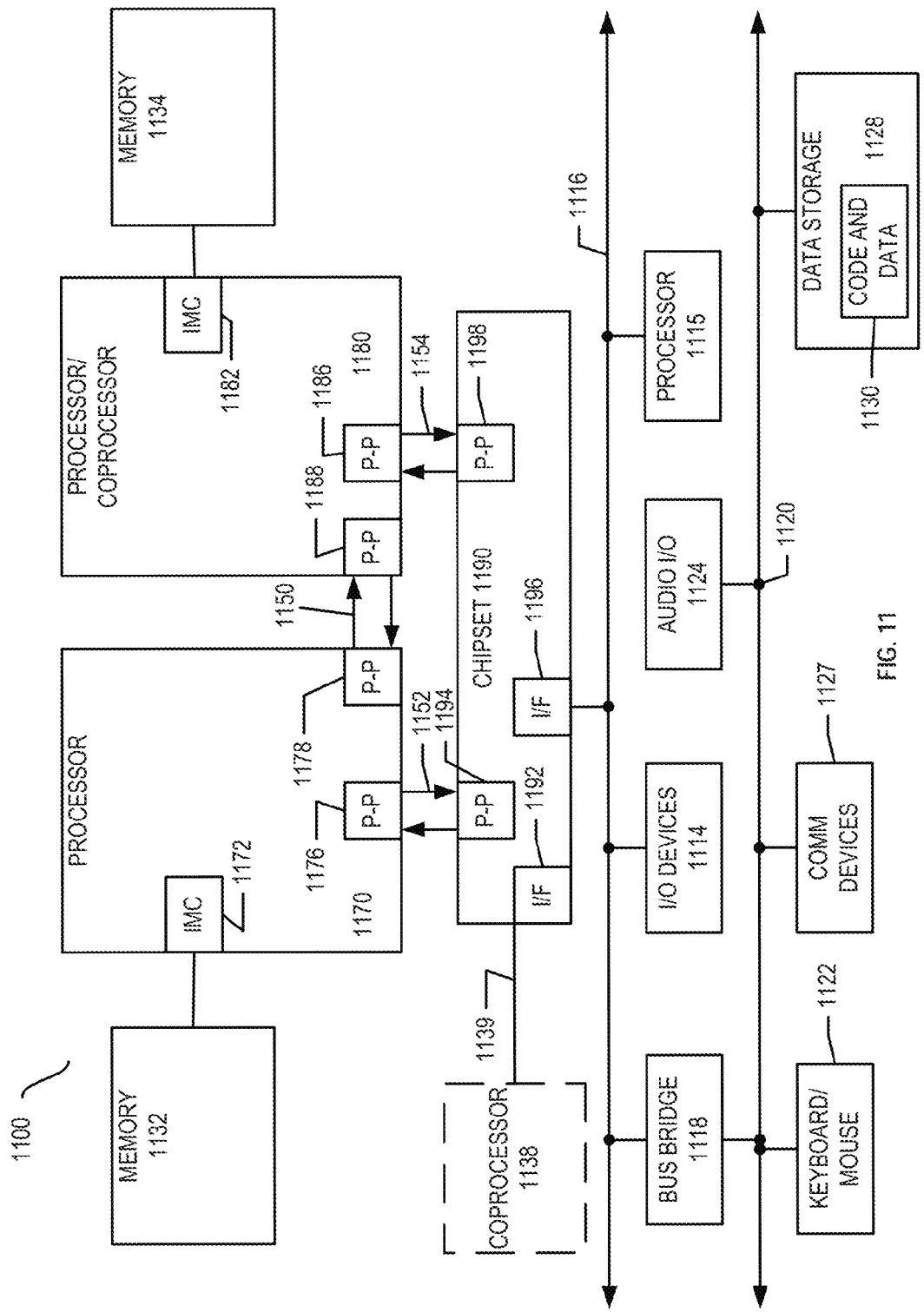
FIG. 11 is a block diagram of a first more specific exemplary system in accordance with an embodiment of the present invention.

Referring now to FIG. 11, shown is a block diagram of a first more specific exemplary system 1100 in accordance with an embodiment of the present invention. As shown in FIG. 11, multiprocessor system 1100 is a point-to-point interconnect system, land includes a first processor 1170 and a second processor 1180 coupled via a point-to-point interconnect 1150. Each of processors 1170 and 1180 may be some version of the processor 1000. In one embodiment of the invention, processors 1170 and 1180 are respectively processors 110 and 115, while coprocessor 1138 is coprocessor 145. In another embodiment, processors 1170 and 1180 are respectively processor 110 coprocessor 145.

Processors 1170 and 1180 are shown including integrated memory controller (IMC) units 1172 and 1182, respectively. As noted above, processor may include a trace generator. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, and 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
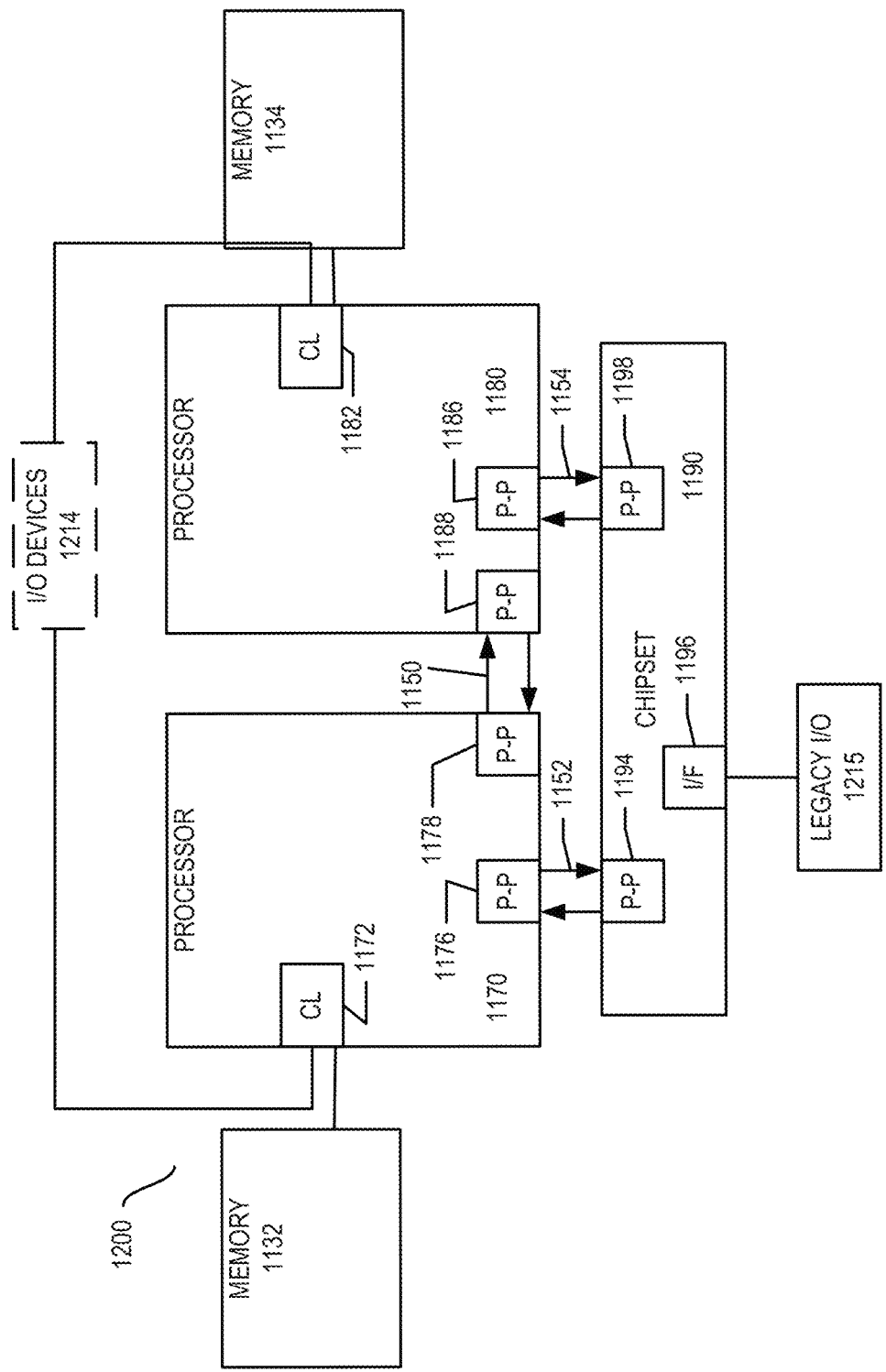
FIG. 12 is a block diagram of a second more specific exemplary system in accordance with an embodiment of the present invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
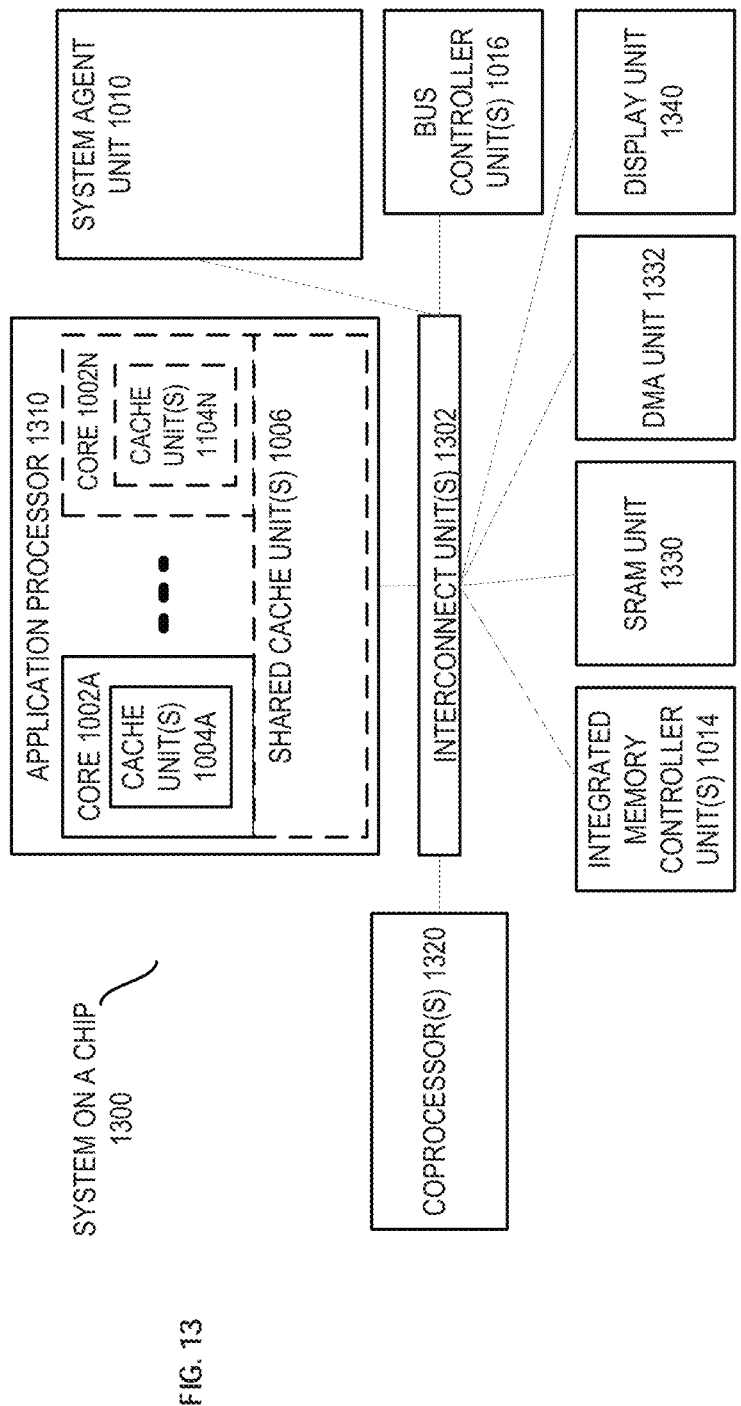
FIG. 13 is a block diagram of a System on a Chip in accordance with an embodiment of the present invention.

Referring now to FIG. 13, shown is a block diagram of a System on a Chip (SoC) 1400 in accordance with an embodiment of the present disclosure. Similar elements in FIG. 10 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 1006; a system agent unit 1010; a bus controller unit(s) 1016; an integrated memory controller unit(s) 1014; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphine, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

What is claimed is:

1. A processor comprising:
   a hardware execution unit to execute instructions;
   a hardware retirement unit to retire executed instructions; and
   a trace generator having a trace suppressor to output a suppressed address trace of the executed instructions, wherein a first executed instruction accessed a relative address referencing an address register, and the suppressed address trace comprises a register hint packet outputted for the first executed instruction.

2. The processor of claim 1, wherein a second executed instruction accessed an address register and the suppressed address trace comprises an address stored in the address register outputted for the second executed instruction.

3. The processor of claim 2, wherein a third executed instruction accessed the address register, the address stored in the address register is unchanged relative to the second executed instruction, and the suppressed address trace comprises no output for the third executed instruction.

4. The processor of claim 2, wherein a third executed instruction accessed a relative address referencing the address register, the address stored in the address register is unchanged relative to the second executed instruction, and the suppressed address trace comprises a register hint packet outputted for the third executed instruction.

5. The processor of claim 4, wherein the register hint packet outputted for the third executed instruction comprises a register hint bit set to indicate the address register is unchanged relative to the second executed instruction.

6. The processor of claim 1, wherein the register hint packet does not include an address.

7. The processor of claim 1, wherein the register hint packet comprises an address stored in the address register.

8. The processor of claim 1, wherein at least one executed instruction accessed an absolute memory address, and the suppressed address trace comprises no output for the at least one executed instruction.

9. The processor of claim 1, wherein the hardware retirement unit comprises a re-order buffer.

10. A method to generate a suppressed address trace for a processor comprising:
    executing instructions with a hardware execution unit of the processor;
    retiring executed instructions with a hardware retirement unit of the processor; and
    generating the suppressed address trace of the executed instructions from a trace suppressor of a trace generator of the processor, wherein a first executed instruction accessed a relative address referencing an address register, and generating the suppressed address trace comprises outputting a register hint packet for the first executed instruction.

11. The method of claim 10, wherein a second executed instruction accessed an address register, and generating the suppressed address trace comprises outputting an address stored in the address register for the second executed instruction.

12. The method of claim 11, wherein a third executed instruction accessed the address register, the address stored in the address register is unchanged relative to the second executed instruction, and generating the suppressed address trace comprises no output for the third executed instruction.

13. The method of claim 12, wherein the second executed instruction is executed before the third executed instruction.

14. The method of claim 11, wherein a third executed instruction accessed a relative address referencing the address register, the address stored in the address register is unchanged relative to the second executed instruction, and generating the suppressed address trace comprises outputting a register hint packet for the third executed instruction.

15. The method of claim 14, wherein the second executed instruction is executed before the third executed instruction.

16. The method of claim 14, wherein the register hint packet outputted for the third executed instruction comprises a register hint bit set indicate the address register is unchanged relative to the second executed instruction.

17. The method of claim 10, wherein the register hint packet does not include an address.

18. The method of claim 10, wherein the register hint packet comprises an address stored in the address register.

19. The method of claim 10, wherein at least one executed instruction accessed an absolute memory address, and generating the suppressed address trace comprises no output for the at least one executed instruction.

20. A non-transitory machine readable storage medium having instructions that, when executed, causes a machine to perform a method comprising:
    generating a suppressed address trace of executed instructions from a trace suppressor of a trace generator of a processor, wherein a first executed instruction accessed a relative address referencing an address register, and generating the suppressed address trace comprises outputting a register hint packet for the first executed instruction.

21. The non-transitory machine readable storage medium of claim 20, wherein a second executed instruction accessed an address register, and generating the suppressed address trace comprises outputting an address stored in the address register for the second executed instruction.

22. The non-transitory machine readable storage medium of claim 21, wherein a third executed instruction accessed the address register, the address stored in the address register is unchanged relative to the second executed instruction, and generating the suppressed address trace comprises no output for the third executed instruction.

23. The non-transitory machine readable storage medium of claim 21, wherein a third executed instruction accessed a relative address referencing the address register, the address stored in the address register is unchanged relative to the second executed instruction, and generating the suppressed address trace comprises outputting a register hint packet for the third executed instruction.

24. The non-transitory machine readable storage medium of claim 20, wherein the register hint packet does not include an address.

25. The non-transitory machine readable storage medium of claim 20, wherein at least one executed instruction accessed an absolute memory address, and generating the suppressed address trace comprises no output for the at least one executed instruction.

* * * * *